United States Patent
Gaffga et al.

(10) Patent No.: US 8,396,893 B2
(45) Date of Patent: Mar. 12, 2013

(54) UNIFIED CONFIGURATION OF MULTIPLE APPLICATIONS

(75) Inventors: Joachim Gaffga, Wiesloch (DE); Juergen Sattler, Wiesloch (DE); Frank Markert, Grossostheim (DE); Robert Viehmann, Waghausl (DE); Werner Wolf, Wiesloch (DE)

(73) Assignee: SAP AG, Walldorf (DE)

( * ) Notice: Subject to any disclaimer, the term of this patent is extended or adjusted under 35 U.S.C. 154(b) by 324 days.

(21) Appl. No.: 12/332,513

(22) Filed: Dec. 11, 2008

(65) Prior Publication Data
US 2010/0153443 A1   Jun. 17, 2010

(51) Int. Cl.
G06F 7/00 (2006.01)
G06F 17/00 (2006.01)
G06F 17/30 (2006.01)
G06F 9/44 (2006.01)
G06F 15/16 (2006.01)

(52) U.S. Cl. .......... 707/792; 707/694; 717/121
(58) Field of Classification Search ........... 707/792, 707/694; 717/121
See application file for complete search history.

(56) References Cited

U.S. PATENT DOCUMENTS

| | | | |
|---|---|---|---|
| 4,079,452 A | 3/1978 | Larson et al. | |
| 4,501,528 A | 2/1985 | Knapp | |
| 5,307,499 A | 4/1994 | Yin | |
| 5,428,791 A * | 6/1995 | Andrew et al. | 717/121 |
| 5,459,868 A | 10/1995 | Fong | |
| 5,647,056 A | 7/1997 | Barrett et al. | |
| 5,657,448 A | 8/1997 | Wadsworth et al. | |
| 5,680,624 A | 10/1997 | Ross | |
| 5,754,845 A | 5/1998 | White | |
| 5,758,062 A | 5/1998 | McMahon et al. | |
| 5,857,102 A | 1/1999 | McChesney et al. | |
| 5,978,579 A | 11/1999 | Buxton et al. | |
| 6,006,035 A * | 12/1999 | Nabahi | 717/175 |
| 6,044,461 A | 3/2000 | Agha et al. | |
| 6,067,525 A | 5/2000 | Johnson et al. | |
| 6,128,730 A | 10/2000 | Levine | |

(Continued)

FOREIGN PATENT DOCUMENTS

| JP | 2004287972 A | 10/2004 |
|---|---|---|
| WO | WO-2004114130 A2 | 12/2004 |

(Continued)

OTHER PUBLICATIONS

"U.S. Appl. No. 11/512,517, Response to Non-Final Office Action mailed Jan. 29, 2009", 16 pgs.

(Continued)

*Primary Examiner* — Greta Robinson
*Assistant Examiner* — Brian E Weinrich
(74) *Attorney, Agent, or Firm* — Schwegman Lundberg & Woessner, P.A.

(57) ABSTRACT

Various embodiments herein provide systems, methods, and software for unified configuration of multiple computer applications. Some embodiments include receiving input configuring a set of distinct computer applications in an application configuration environment. The application configuration environment may include a configuration repository that stores the settings of each distinct computer application. Such embodiments may further deploy the configuration settings from the configuration repository of the application configuration environment to at least one application execution environment including an instance of at least one of the set of distinct computer applications.

15 Claims, 6 Drawing Sheets

U.S. PATENT DOCUMENTS

| | | | |
|---|---|---|---|
| 6,161,123 A | 12/2000 | Renouard et al. | |
| 6,161,176 A | 12/2000 | Hunter et al. | |
| 6,185,587 B1 | 2/2001 | Bernardo et al. | |
| 6,189,139 B1 | 2/2001 | Ladd | |
| 6,230,305 B1 | 5/2001 | Meares | |
| 6,301,710 B1 | 10/2001 | Fujiwara | |
| 6,321,282 B1 | 11/2001 | Horowitz et al. | |
| 6,324,578 B1 | 11/2001 | Cox et al. | |
| 6,397,232 B1 | 5/2002 | Cheng-Hung et al. | |
| 6,449,624 B1 | 9/2002 | Hammack et al. | |
| 6,453,302 B1 | 9/2002 | Johnson et al. | |
| 6,466,972 B1 | 10/2002 | Paul et al. | |
| 6,470,464 B2 | 10/2002 | Bertram et al. | |
| 6,513,045 B1 | 1/2003 | Casey et al. | |
| 6,523,027 B1 | 2/2003 | Underwood | |
| 6,538,668 B1 | 3/2003 | Ruberg et al. | |
| 6,539,372 B1 | 3/2003 | Casey et al. | |
| 6,728,877 B2 | 4/2004 | Mackin et al. | |
| 6,763,327 B1 | 7/2004 | Songer et al. | |
| 6,804,709 B2 | 10/2004 | Manjure et al. | |
| 6,810,401 B1 | 10/2004 | Thompson et al. | |
| 6,868,392 B1 | 3/2005 | Ogasawara | |
| 7,031,951 B2 | 4/2006 | Mancisidor et al. | |
| 7,032,114 B1 | 4/2006 | Moran | |
| 7,051,130 B1 | 5/2006 | Horowitz et al. | |
| 7,062,502 B1 | 6/2006 | Kesler | |
| 7,089,317 B2 | 8/2006 | Jeyaraman et al. | |
| 7,099,945 B2 | 8/2006 | Lugger et al. | |
| 7,174,400 B2 | 2/2007 | Horowitz et al. | |
| 7,181,731 B2 | 2/2007 | Pace et al. | |
| 7,206,827 B2 | 4/2007 | Viswanath et al. | |
| 7,209,851 B2 | 4/2007 | Singh et al. | |
| 7,228,326 B2 | 6/2007 | Srinivasan et al. | |
| 7,283,816 B2 | 10/2007 | Fok et al. | |
| 7,299,382 B2 | 11/2007 | Jorapur | |
| 7,305,659 B2 | 12/2007 | Muller et al. | |
| 7,337,317 B2 | 2/2008 | Meggitt et al. | |
| 7,340,411 B2 | 3/2008 | Cook | |
| 7,346,766 B2 | 3/2008 | Mackin et al. | |
| 7,360,211 B2 | 4/2008 | Hyden et al. | |
| 7,376,682 B2 | 5/2008 | Ramacher et al. | |
| 7,379,455 B2 | 5/2008 | Pickett | |
| 7,412,497 B2 | 8/2008 | Viswanath et al. | |
| 7,421,621 B1 | 9/2008 | Zambrana et al. | |
| 7,426,694 B2 | 9/2008 | Gross et al. | |
| 7,451,451 B2 * | 11/2008 | Schaefer | 719/310 |
| 7,487,231 B2 | 2/2009 | Brown et al. | |
| 7,519,964 B1 | 4/2009 | Islam et al. | |
| 7,526,457 B2 | 4/2009 | Duevel et al. | |
| 7,540,014 B2 | 5/2009 | Vasishth et al. | |
| 7,546,390 B2 | 6/2009 | Horowitz et al. | |
| 7,590,669 B2 | 9/2009 | Yip et al. | |
| 7,593,124 B1 | 9/2009 | Sheng et al. | |
| 7,599,895 B2 | 10/2009 | Nugent | |
| 7,603,452 B1 * | 10/2009 | Guo | 709/223 |
| 7,606,840 B2 | 10/2009 | Malik | |
| 7,609,651 B1 | 10/2009 | Mcbride et al. | |
| 7,610,582 B2 | 10/2009 | Becker et al. | |
| 7,617,256 B2 | 11/2009 | Mohamed et al. | |
| 7,640,542 B2 | 12/2009 | Herenyi et al. | |
| 7,644,432 B2 | 1/2010 | Patrick et al. | |
| 7,657,887 B2 | 2/2010 | Kothandaraman et al. | |
| 7,665,082 B2 | 2/2010 | Wyatt et al. | |
| 7,685,577 B2 | 3/2010 | Pace et al. | |
| 7,694,181 B2 | 4/2010 | Noller et al. | |
| 7,702,897 B2 | 4/2010 | Reed et al. | |
| 7,716,634 B2 | 5/2010 | Ross et al. | |
| 7,725,200 B2 | 5/2010 | Reed et al. | |
| 7,725,877 B2 | 5/2010 | Andrade et al. | |
| 7,739,657 B2 | 6/2010 | Rolfs | |
| 7,823,124 B2 | 10/2010 | Sattler et al. | |
| 7,827,528 B2 | 11/2010 | Sattler et al. | |
| 7,831,568 B2 | 11/2010 | Sattler et al. | |
| 7,831,637 B2 | 11/2010 | Sattler et al. | |
| 7,908,589 B2 | 3/2011 | Sattler et al. | |
| 7,912,800 B2 | 3/2011 | Sattler et al. | |
| 8,065,661 B2 | 11/2011 | Sattler et al. | |
| 2001/0044834 A1 | 11/2001 | Bradshaw et al. | |
| 2001/0054091 A1 | 12/2001 | Lenz et al. | |
| 2002/0026572 A1 | 2/2002 | Joory | |
| 2002/0095663 A1 | 7/2002 | Joory | |
| 2002/0099578 A1 | 7/2002 | Eicher et al. | |
| 2002/0104097 A1 | 8/2002 | Jerding et al. | |
| 2002/0116373 A1 | 8/2002 | Nishikawa et al. | |
| 2002/0138570 A1 | 9/2002 | Hickey | |
| 2002/0147784 A1 | 10/2002 | Gold et al. | |
| 2002/0156947 A1 | 10/2002 | Nishio | |
| 2002/0188625 A1 | 12/2002 | Jans et al. | |
| 2003/0005411 A1 | 1/2003 | Gerken | |
| 2003/0023963 A1 | 1/2003 | Birkholz et al. | |
| 2003/0115292 A1 | 6/2003 | Griffin et al. | |
| 2003/0120780 A1 | 6/2003 | Zhu et al. | |
| 2003/0135842 A1 | 7/2003 | Frey et al. | |
| 2003/0227392 A1 | 12/2003 | Ebert et al. | |
| 2003/0237093 A1 | 12/2003 | Marsh | |
| 2004/0019669 A1 | 1/2004 | Viswanath et al. | |
| 2004/0019670 A1 | 1/2004 | Viswanath et al. | |
| 2004/0031030 A1 | 2/2004 | Kidder et al. | |
| 2004/0060047 A1 | 3/2004 | Talati et al. | |
| 2004/0088691 A1 | 5/2004 | Hammes et al. | |
| 2004/0111417 A1 | 6/2004 | Goto et al. | |
| 2004/0176996 A1 | 9/2004 | Powers et al. | |
| 2004/0186927 A1 | 9/2004 | Eryurek et al. | |
| 2004/0268342 A1 | 12/2004 | Hyden et al. | |
| 2005/0007964 A1 | 1/2005 | Falco et al. | |
| 2005/0044215 A1 | 2/2005 | Cohen et al. | |
| 2005/0044546 A1 | 2/2005 | Niebling et al. | |
| 2005/0080801 A1 | 4/2005 | Kothandaraman et al. | |
| 2005/0086195 A1 | 4/2005 | Tan et al. | |
| 2005/0108219 A1 | 5/2005 | De La Huerga | |
| 2005/0108707 A1 | 5/2005 | Taylor et al. | |
| 2005/0138558 A1 | 6/2005 | Duevel et al. | |
| 2005/0144474 A1 | 6/2005 | Takala et al. | |
| 2005/0160419 A1 | 7/2005 | Alam et al. | |
| 2005/0188422 A1 | 8/2005 | Jooste | |
| 2005/0193103 A1 | 9/2005 | Drabik | |
| 2005/0262076 A1 | 11/2005 | Voskuil | |
| 2005/0262499 A1 | 11/2005 | Read | |
| 2005/0268282 A1 | 12/2005 | Laird | |
| 2005/0278202 A1 * | 12/2005 | Broomhall et al. | 705/7 |
| 2005/0278280 A1 | 12/2005 | Semerdzhiev et al. | |
| 2006/0037000 A1 * | 2/2006 | Speeter et al. | 717/120 |
| 2006/0047793 A1 | 3/2006 | Agrawal et al. | |
| 2006/0173857 A1 | 8/2006 | Jackson | |
| 2006/0184917 A1 | 8/2006 | Troan et al. | |
| 2006/0184926 A1 | 8/2006 | Or et al. | |
| 2006/0224637 A1 | 10/2006 | Wald | |
| 2006/0234698 A1 | 10/2006 | Fok et al. | |
| 2006/0242697 A1 | 10/2006 | Takemura | |
| 2006/0248450 A1 | 11/2006 | Wittenberg et al. | |
| 2006/0253588 A1 | 11/2006 | Gao et al. | |
| 2007/0006161 A1 | 1/2007 | Kuester et al. | |
| 2007/0016591 A1 | 1/2007 | Beadles et al. | |
| 2007/0022323 A1 | 1/2007 | Loh et al. | |
| 2007/0025704 A1 | 2/2007 | Tsukazaki et al. | |
| 2007/0074203 A1 | 3/2007 | Curtis et al. | |
| 2007/0079289 A1 | 4/2007 | MacCaux | |
| 2007/0079291 A1 | 4/2007 | Roth | |
| 2007/0093926 A1 | 4/2007 | D. Braun et al. | |
| 2007/0097975 A1 | 5/2007 | Rakers et al. | |
| 2007/0157185 A1 | 7/2007 | Semerdzhiev et al. | |
| 2007/0157192 A1 | 7/2007 | Hoefler et al. | |
| 2007/0168065 A1 | 7/2007 | Nixon et al. | |
| 2007/0168971 A1 | 7/2007 | Royzen et al. | |
| 2007/0198437 A1 | 8/2007 | Eisner et al. | |
| 2007/0234274 A1 | 10/2007 | Ross et al. | |
| 2007/0234293 A1 | 10/2007 | Noller et al. | |
| 2007/0257715 A1 | 11/2007 | Semerdzhiev et al. | |
| 2008/0059474 A1 | 3/2008 | Lim | |
| 2008/0059490 A1 | 3/2008 | Sattler et al. | |
| 2008/0059537 A1 | 3/2008 | Sattler et al. | |
| 2008/0059630 A1 | 3/2008 | Sattler et al. | |
| 2008/0071555 A1 | 3/2008 | Sattler et al. | |
| 2008/0071718 A1 | 3/2008 | Sattler et al. | |
| 2008/0071828 A1 | 3/2008 | Sattler et al. | |
| 2008/0071839 A1 | 3/2008 | Sattler et al. | |
| 2008/0082517 A1 | 4/2008 | Sattler et al. | |

| | | | |
|---|---|---|---|
| 2008/0126375 | A1 | 5/2008 | Sattler et al. |
| 2008/0126448 | A1 | 5/2008 | Sattler et al. |
| 2008/0127082 | A1 | 5/2008 | Birimisa et al. |
| 2008/0127084 | A1 | 5/2008 | Sattler et al. |
| 2008/0127085 | A1 | 5/2008 | Sattler et al. |
| 2008/0127086 | A1 | 5/2008 | Sattler et al. |
| 2008/0127123 | A1 | 5/2008 | Sattler et al. |
| 2008/0195579 | A1 | 8/2008 | Kennis et al. |
| 2009/0024990 | A1 | 1/2009 | Singh et al. |
| 2009/0157455 | A1 | 6/2009 | Kuo et al. |
| 2009/0193439 | A1 | 7/2009 | Bernebeu-auban et al. |
| 2009/0300416 | A1 | 12/2009 | Watanabe et al. |
| 2010/0082518 | A1 | 4/2010 | Gaffga et al. |
| 2010/0153468 | A1 | 6/2010 | Lange et al. |
| 2010/0192135 | A1 | 7/2010 | Krishnaswamy et al. |
| 2011/0035629 | A1 | 2/2011 | Noller et al. |

FOREIGN PATENT DOCUMENTS

| | | | |
|---|---|---|---|
| WO | WO-2005045670 | A1 | 5/2005 |

OTHER PUBLICATIONS

"U.S. Appl. No. 11/512,884, Final Office Action mailed Dec. 19, 2008", 11 pgs.

"U.S. Appl. No. 11/512,886, Non-Final Office Action mailed Dec. 26, 2008", 10 pgs.

"U.S. Appl. No. 11/512,442, Response filed Jan. 4, 2010 to Non Final Office Action mailed Oct. 1, 2009", 10 pgs.

"U.S. Appl. No. 11/512,443, Final Office Action mailed Jan. 22, 2010", 14 pgs.

"U.S. Appl. No. 11/512,517, Examiner Interview Summary mailed Dec. 24, 2009", 3 pgs.

"U.S. Appl. No. 11/512,517, Notice of Allowance mailed Jan. 21, 2010", 8 pgs.

"U.S. Appl. No. 11/512,517, Response filed Dec. 14, 2009 to Non Final Office Action mailed Sep. 16, 2009", 8 pgs.

"U.S. Appl. No. 11/512,520, Notice of Allowance mailed Jan. 25, 2010", 6 pgs.

"U.S. Appl. No. 11/512,609, Final Office Action mailed Nov. 20, 2009", 15 pgs.

"U.S. Appl. No. 11/512,886, Notice of Allowance mailed Dec. 24, 2009", 8 pgs.

"European Application Serial No. 09012347.2, Extended European Search Report mailed Nov. 26, 2009", 5 pgs.

"U.S. Appl. No. 11/512,442, Final Office Action mailed Apr. 21, 2010", 13 pgs.

"U.S. Appl. No. 11/512,443, Response filed Apr. 22, 2010 to Final Office Action mailed Jan. 22, 2010", 12 pgs.

"U.S. Appl. No. 11/512,457, Non-Final Office Action mailed May 13, 2010", 11 pgs.

"U.S. Appl. No. 11/512,516, Final Office Action mailed Mar. 5, 2010", 16 pgs.

"U.S. Appl. No. 11/512,516, Response filed Apr. 30, 2010 to Final Office Action mailed Mar. 5, 2010", 9 pgs.

"U.S. Appl. No. 11/512,608, Non-Final Office Action mailed May 12, 2010", 12 pgs.

Krintz, Chandra J., ""Reducing load delay to improve performance of Internet-computing programs"", University of California, San Diego, (2001), 225 pgs.

"U.S. Appl. No. 11/511,357 Non-Final Office Action mailed Jul. 2, 2010", 11 pgs.

"U.S. Appl. No. 11/512,441, Non-Final Office Action mailed Jun. 21, 2010", 8 pgs.

"U.S. Appl. No. 11/512,442, Response filed Jun. 21, 2010 to Final Office Action mailed Apr. 21, 2010", 9 pgs.

"U.S. Appl. No. 11/512,518, Non-Final Office Action mailed May 27, 2010", 14 pgs.

"U.S. Appl. No. 11/512,520, Notice of Allowance mailed Jun. 15, 2010", 6 pgs.

"U.S. Appl. No. 11/512,440, Non-Final Office Action mailed Jun. 17, 2010", 14 pgs.

Bellissard, Luc, et al., "Component-based Programming and Application Management with Olan, Proceedings of Workshop on Distributed Computing", Retrieved on [Jun. 15, 2010] Retrieved from the Internet:URL<http://www.springerl ink.com/contenUf2g rl4083393124/ u litext. pdf>, (1995).

Hwang, Jeong Hee, et al., "Context Based Recommendation Service in Ubiquitous Commerce", Database Laboratory, Chungbuk National University, Korea, Springer—Verlag Berlin Heidelberg,, (2005).

"U.S. Appl. No. 11/512,442, Non Final Office Action mailed Oct. 1, 2009", 15 pgs.

"U.S. Appl. No. 11/512,443, Examiner Interview Summary mailed Oct. 7, 2009", 4 pgs.

"U.S. Appl. No. 11/512,443, Final Office Action mailed Feb. 6, 2009", 20 pgs.

"U.S. Appl. No. 11/512,443, Non-Final Office Action mailed Jun. 26, 2009", 11 pgs.

"U.S. Appl. No. 11/512,443, Response filed Apr. 3, 2009 to Final Office Action mailed Feb. 6, 2009", 13 pgs.

"U.S. Appl. No. 11/512,443, Response filed Sep. 28, 2009 to Non Final Office Action mailed Jun. 26, 2009", 16 pgs.

"U.S. Appl. No. 11/512,516, Non-Final Office Action mailed Feb. 4, 2009", 12 pgs.

"U.S. Appl. No. 11/512,516, Non-Final Office Action mailed Jul. 10, 2009", 15 pgs.

"U.S. Appl. No. 11/512,516, Response filed Apr. 28, 2009 to Non Final Office Action mailed Feb. 4, 2009", 16 pgs.

"U.S. Appl. No. 11/512,516, Response filed Oct. 9, 2009 to Non Final Office Action mailed Jul. 10, 2009", 9 pgs.

"U.S. Appl. No. 11/512,517, Non-Final Office Action mailed Sep. 16, 2009", 16 pgs.

"U.S. Appl. No. 11/512,517, Notice of Allowance mailed Apr. 3, 2009", 10 pgs.

"U.S. Appl. No. 11/512,519, Final Office Action mailed Feb. 2, 2009", 14 pgs.

"U.S. Appl. No. 11/512,520, Non-Final Office Action mailed Jul. 22, 2009", 14 pgs.

"U.S. Appl. No. 11/512,520, Response filed Oct. 22, 2009 to Non Final Office Action mailed Jul. 22, 2009", 13 pgs.

"U.S. Appl. No. 11/512,609, Non Final Office Action mailed Apr. 27, 2009", 15 pgs.

"U.S. Appl. No. 11/512,609, Response filed Feb. 17, 2009 to Final Office Action mailed Dec. 8, 2008", 10 pgs.

"U.S. Appl. No. 11/512,609, Response filed Jul. 24, 2009 to Non Final Office Action mailed Apr. 27, 2009", 11 pgs.

"U.S. Appl. No. 11/512,886, Examiner Interview Summary mailed Sep. 29, 2009", 2 pgs.

"U.S. Appl. No. 11/512,886, Final Office Action mailed Jun. 24, 2009", 11 pgs.

"U.S. Appl. No. 11/512,886, Response filed Mar. 25, 2009 to Non Final Office Action mailed Dec. 26, 2008", 9 pgs.

"U.S. Appl. No. 11/512,886, Response filed Sep. 22, 2009 to Final Office Action mailed Jun. 24, 2009", 10 pgs.

"U.S. Appl. No. 11/512,443, Response filed Oct. 9, 2008 to Non-Final Office Action mailed Jul. 9, 2008", 11 pgs.

"U.S. Appl. No. 11/512,443, Non-Final Office Action mailed Jul. 9, 2008", 17 pgs.

"U.S. Appl. No. 11/512,517, Non-Final Office Action mailed Oct. 29, 2008", 13 pgs.

"U.S. Appl. No. 11/512,519 response filed Nov. 11, 2008 to Non-Final Office Action mailed Sep. 11, 2008", 15 pgs.

"U.S. Appl. No. 11/512,519, Non-FinalOffice Action mailed Sep. 11, 2008", 14 pgs.

"U.S. Appl. No. 11/512,609, Non Final Office Action mailed on Jun. 19, 2008", 9 pgs.

"U.S. Appl. No. 11/512,609, Response filed Sep. 19, 2008 to Non-Final Office Action mailed Jun. 19, 2008", 8 pgs.

"U.S. Appl. No. 11/512,609 Final Office Action mailed Dec. 8, 2008", 14 pgs.

"U.S. Appl. No. 11/512,884, Non-Final Office Action Mailed Jul. 29, 2008", 12 pgs.

"U.S. Appl. No. 11/512,884, Response filed Sep. 23, 2008 to Non-Final Office Action mailed Jul. 29, 2008", 17 pgs.

"International Application Serial No. PCT/EP2007/007460, International Search Report Nov. 2, 2007", 5 pgs.

"International Application Serial No. PCT/EP2007/007460, Written Opinion Nov. 2, 2007", 7 pgs.
"International Application Serial No. PCT/EP2007/007461. International Search Report Nov. 26, 2007", 7 pgs.
"International Application Serial No. PCT/EP2007/007461, International Search Report mailed Feb. 5, 2008", 8 pgs.
"International Application Serial No. PCT/EP2007/007461, Written Opinion mailed Feb. 5, 2008", 9 pgs.
"International Application Serial No. PCT/EP2007/007462, International Search Report Mailed Mar. 17, 2008", 7 pgs.
"International Application Serial No. PCT/EP2007/007462, Partial International Search Report mailed Dec. 17, 207", 8 pgs.
"International Application Serial No. PCT/EP2007/007462, Written Opinion Mailed Mar. 17, 2008", 8 pgs.
"International Application Serial No. PCT/EP2007/007490, International Search Report Oct. 26, 2007", 4 pgs.
"International Application Serial No. PCT/EP2007/007490, International Search Report mailed Jan. 24, 2008", 7 pgs.
"International Application Serial No. PCT/EP2007/007490, Written Opinion mailed Jan. 24, 2008", 9 pgs.
"International Application Serial No. PCT/EP2007/007491, International Search Report Oct. 22, 2007", 5 pgs.
"International Application Serial No. PCT/EP2007/007491, Written Opinion Oct. 22, 2007", 6 pgs.
"International Application Serial No. PCT/EP2007/007515, International Search Report Nov. 12, 2007", 8 pgs.
"International Application Serial No. PCT/EP2007/007515, International Search Report mailed Jan. 24, 2008", 8 pgs.
"International Application Serial No. PCT/EP2007/007515, Written Opinion mailed Jan. 24, 2008", 12 pgs.
Indigorose, "Setup Factory", *User's Guide IndidoRose Software Design No. 2*, (Mar. 1998), 82 pgs.
Liu, et al., "A Knowledge-Based Approach to Requirements Analysis", (1995), 26-33.
"U.S. Appl. No. 11/512,441, Notice of Allowance mailed Jul. 19, 2011", 13 pgs.
"U.S. Appl. No. 12/243,827, Notice of Allowance mailed Jul. 29, 2011", 10 pg s.
Jan, EA-EE, et al., "A novel approach for proper name transliteration verification", Chinese Spoken Language Processing (ISCSLP), DOI: 10.1109/ISCSLP.2010.5684842, (2010), 89-94.
Lingamarla, Sridevi, et al., "System for Automated Validation of Embedded Software in Multiple Operating Configurations", IEEE, 4 pgs.
Othman, M., et al., "Analysis of TCP-Reno and TCP-Vegas over AOMDV routing protocol for mobile ad hoc network", Advanced Communication Technology (ICACT), 2010 The 12th International Conference on vol. 2, (2010), 1104-1108.
Tseng, Chiu-Yu, et al., "An initial investigation of L1 and L2 discourse speech planning in English", Chinese Spoken Language Processing (ISCSLP), DOI: 10.1109/ISCSLP.2010.5684851, (2010), 55-59.
"U.S. Appl. No. 11/512,440, Notice of Allowance mailed Nov. 12, 2010.", 14 pgs.
"U.S. Appl. No. 11/512,440, Response filed Oct. 18, 2010 to Non Final Office Action mailed Jun. 17, 2010", 11 pgs.
"U.S. Appl. No. 11/512,441, Final Office Action mailed Dec. 1, 2010", 7 pgs.
"U.S. Appl. No. 11/512,441, Non Final Office Action mailed Mar. 23, 2011", 9 pgs.
"U.S. Appl. No. 11/512,441, Response filed Mar. 1, 2011 to Final Office Action mailed Dec. 1, 2010", 8 pgs.
"U.S. Appl. No. 11/512,441, Response filed Sep. 21, 2010 to Non Final Office Action mailed Jun. 21, 2010", 8 pgs.
"U.S. Appl. No. 11/512,442, Non Final Office Action mailed Feb. 7, 2011", 14 pgs.

"U.S. Appl. No. 11/512,443, Notice of Allowance mailed Sep. 21, 2010", 17 pgs.
"U.S. Appl. No. 11/512,457, Notice of Allowance mailed Aug. 13, 2010", 13 pgs.
"U.S. Appl. No. 11/512,457, Notice of Allowance mailed Sep. 17, 2010", 7 pgs.
"U.S. Appl. No. 11/512,457, Response filed Aug. 5, 2010 to Non Final Office Action mailed May 13, 2010", 10 pgs.
"U.S. Appl. No. 11/512,516 Non-Final Office Action mailed Jul. 8, 2010", 20 pgs.
"U.S. Appl. No. 11/512,516, Final Office Action mailed Dec. 22, 2010", 23 pgs.
"U.S. Appl. No. 11/512,516, Response filed Oct. 8, 2010 to Non Final Office Action mailed Jul. 8, 2010", 11 pgs.
"U.S. Appl. No. 11/512,517, Non-Final Office Action mailed Aug. 16, 2010", 30 pgs.
"U.S. Appl. No. 11/512,517, Notice of Allowance mailed Feb. 8, 2011", 10 pgs.
"U.S. Appl. No. 11/512,517, Response filed Nov. 16, 2010 to Non Final Office Action mailed Aug. 16, 2010", 8 pgs.
"U.S. Appl. No. 11/512,518 Final Office Action mailed Oct. 15, 2010", 15 pgs.
"U.S. Appl. No. 11/512,518, Response filed Aug. 24, 2010 to Non Final Office Action mailed May 27, 2010", 10 pgs.
"U.S. Appl. No. 11/512,520 Notice of Allowance mailed Sep. 29, 2010", 6 pgs.
"U.S. Appl. No. 11/512,608 Notice of Allowance mailed Sep. 8, 2010", 8 pgs.
"U.S. Appl. No. 11/512,608, Notice of Allowance mailed Aug. 13, 2010", 9 pgs.
"U.S. Appl. No. 11/512,608, Response filed Aug. 5, 2010 to Non Final Office Action mailed May 12, 2010", 10 pgs.
"U.S. Appl. No. 12/336,931, Non Final Office Action mailed May 14, 2011", 11 pgs.
"U.S. Appl. No. 12/336,931, Response filed Jun. 14, 2011 to Non Final Office Action mailed Mar. 14, 2011", 10 pgs.
Brown, Wanda Jones, et al., ""Configuration Management Plan for the Science Data Processing System"", Upper Marlboro, Maryland, (Apr. 2001).
Dotoli, et al., "A decision support system for the supply chain configuration", IEEE, (Oct. 8, 2003), 6 pgs.
Ganguly, et al., "Reducing Complexity of Software Deployment with Delta Configuration", IEEE, (May 21, 2007), 729-732.
Gu, Mingyang, et al., "Component Retrieval Using Conversational Case-Base Reasoning", IEA/AIE, Annecy, France, (Jun. 27-30, 2006), 12 pgs.
Kahl, Fredrik, et al., "Critical configurations for n-view projective reconstruction", IEEE, (Dec. 14, 2001), 6 pgs.
Park, Young, "Software retrieval by samples using concept analysis", Journal of Systems and Software 54, (2000), 179-183.
Sloane, et al., "Modeling Deployment and Configuration of Cobra Systems with UML", IEEE, (2000), 778.
Virgilo, "A Rule-based Approach to Content Delivery Adaptation in Web Information Systems", Proc. 7th International Conference on Mobile Data Management, IEEE, (May 12, 2006), 4 pgs.
Ying Li, et al., "Modeling and Verifying Configuration in Service Deployment", IEEE, (2006), 8 pgs.
"U.S. Appl. No. 11/512,886, Notice of Allowance mailed Nov. 2, 2011", 14 pgs.
"U.S. Appl. No. 12/243,827, Notice of Allowance mailed Nov. 4, 2011", 5 pgs.
"U.S. Appl. No. 12/336,931, Final Office Action mailed Aug. 9, 2011", 11 pgs.
US 7,571,147, 08/2009, Sattler et al. (withdrawn)

* cited by examiner

UNIFIED CONFIGURATION OF MULTIPLE APPLICATIONS

BACKGROUND INFORMATION

Configuring software applications can be a difficult task. The difficulty in configuring such systems grows in complexity as the size of the software application increases. An example of a complex software application to configure is an enterprise resource planning ("ERP") application. Efforts to configure such applications often involve a large number of employees and even consultants. These efforts may string out over many months, and even multiple years. Further, modifying a large software application configuration or upgrading such an application can, depending on the size of the configuration modification project or scope of the application upgrade, may involve equal amounts of time and cost as an initial implementation.

In many organizations utilizing ERP applications, more than one ERP application may be implemented. This may be due to migration from one ERP platform to another, mergers and acquisitions of other organizations, or other reasons. In such instances when configuring multiple ERP applications, the complex issues related thereto are at least doubled. Each software application is configured separately.

DETAILED DESCRIPTION

Figure 1:
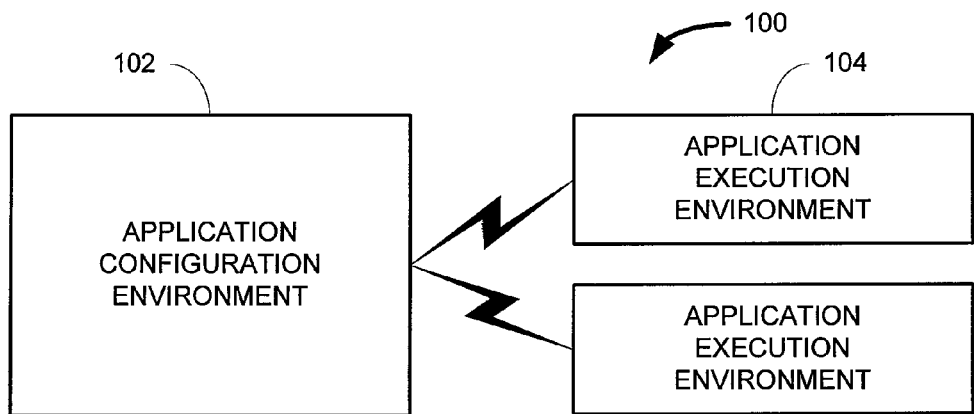
FIG. 1 is a block diagram of a system according to an example embodiment.

Various embodiments described herein provide system, methods, and software to reduce the complexity of configuring software applications, such as large-scale enterprise resource planning ("ERP") applications. Some embodiments reduce the complexity of configuring multiple distinct instances of the same or differing ERP applications through a unified application configuration environment. The configuring may be performed in such a single application configuration environment and configuration settings may be deployed to one or more application execution environments where respective ERP applications execute. The configuring may be performed once and translated to a configuration of each target computer application. For example, two distinct computer applications may be deployed to distinct application execution environments. The term "distinct computer applications" is used herein to differentiate between at least two computer applications that are either different in one or more ways including version number, and the software development organizations that developed the at least two computer applications. The configuring may be performed in a single application configuration environment and when the configuration settings are deployed, the configuration settings are translated to a form of each distinct computer application and deployed from the single application configuration environment to the respective application execution environments. These and other embodiments are described below.

In the following detailed description, reference is made to the accompanying drawings that form a part hereof, and in which is shown by way of illustration specific embodiments in which the inventive subject matter may be practiced. These embodiments are described in sufficient detail to enable those skilled in the art to practice them, and it is to be understood that other embodiments may be utilized and that structural, logical, and electrical changes may be made without departing from the scope of the inventive subject matter. Such embodiments of the inventive subject matter may be referred to, individually and/or collectively, herein by the term "invention" merely for convenience and without intending to voluntarily limit the scope of this application to any single invention or inventive concept if more than one is in fact disclosed.

The following description is, therefore, not to be taken in a limited sense, and the scope of the inventive subject matter is defined by the appended claims.

The functions or algorithms described herein are implemented in hardware, software or a combination of software and hardware in one embodiment. The software comprises computer executable instructions stored on computer readable media such as memory or other type of storage devices. Further, described functions may correspond to modules, which may be software, hardware, firmware, or any combination thereof. Multiple functions are performed in one or more modules as desired, and the embodiments described are merely examples. The software is executed on a digital signal processor, ASIC, microprocessor, or other type of processor operating on a system, such as a personal computer, server, a router, or other device capable of processing data including network interconnection devices.

Some embodiments implement the functions in two or more specific interconnected hardware modules or devices with related control and data signals communicated between and through the modules, or as portions of an application-specific integrated circuit. Thus, the exemplary process flow is applicable to software, firmware, and hardware implementations.

FIG. 1 is a block diagram of a system 100 according to an example embodiment. The system 100 includes an application configuration environment 102 a first application execution environment 104 and a second application execution environment 106. The application execution environments 104, 106 and the application configuration environment 102 are typically interconnected via one or more networks.

The application configuration environment 102 is a system 100 environment within which an application is configurable. However, the applications will, or do, execute within at least one of the application execution environments 104, 106. In some embodiments, this arrangement of the application configuration environment 102 and the application execution environments 104, 106 separates the configuration of the applications from the environment within which they execute. When application configurations are established, all or part of the configurations are then deployed to the application execution environments 104, 106. This deployment can occur to one or more separate instances of each of a plurality of applications in the application execution environments 104, 106. Although two application execution environments 104, 106 are illustrated, one application execution environment 104, 106 may exist or more application execution environments 104, 106 may exist. The deployment may be made to one or more of the multiple application execution environments 104, 106.

As stated above, the application execution environments 104, 106 are computing environments within which one or more applications may execute. Such applications may include ERP computer applications, or portions thereof. For example, one application may be an account portion of a first ERP application and another application may be a customer relationship management portion of a second ERP application. The first and second ERP applications are typically distinct computer applications, such as may be developed and offered by different software development organizations. However, the distinction computer applications may simply be different computer applications offered by the same software development organization that may offer the same or alternative functionality and data processing activities.

In some embodiments of the system 100, the multiple computer applications that execute in the same or different application execution environments 104, 106 may be configured in the single application configuration environment 102. As a result, the processes, procedures, and data processing activities may be specified in a single location, translated to a configuration setting form of computer applications tasked with implementing the specified processes, procedures, and data processing activities, and deployed.

Figure 2:
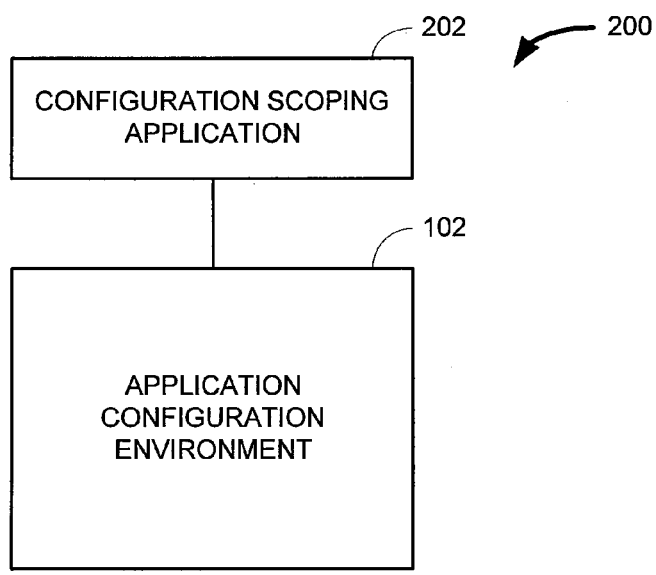
FIG. 2 is a block diagram of a system according to an example embodiment.

FIG. 2 is a block diagram of a system 200 according to an example embodiment. The system 200 includes a configuration scoping application 202 and the application configuration environment 102.

The configuration scoping application 202 typically is a software tool that executes on a computing device, such as a portable computer, on a same computing device within which the application configuration environment 102 exists, or on another computing device that can be communicatively coupled to the application configuration environment 102.

The configuration scoping application 202, when executed, typically presents a set of scoping questions to a user. The scoping questions are linked to one of many adaptation catalog entries. The adaptation catalog entries include a representation of all of the solution capabilities of applications to be configured, and eventually executed in one or more of the application execution environments 104, 106. In some embodiments, the solution capabilities are hierarchically divided into areas, packages, topics, and options. There may be multiple areas and each area may have multiple packages. Each package may have multiple topics and each topic may have multiple options.

In some embodiments, such as in an example embodiment where the application to be configured is an ERP application, the adaptation catalog may provide in the area Sales, a package Customer Order Management that contains the topics Sales Order Quote, Sales Order, Sales Order Analysis, and others. On that level, one or more options typically exist such as Approval Processing.

In the configuration scoping application 202, as stated above, each scoping question may be linked to an adaptation catalog entry. An adaptation catalog entry further includes a rule. These rules typically model dependencies between the areas, packages, topics, and options and corresponding solution capabilities of the application. A rule may specify required inclusion or exclusion of other areas, packages, topics, or options, or may require specification of further areas, packages, topics, or options. A rule may also specify a recommendation or default area, package, topic, or option.

For example, a first example scoping question, "What is the primary focus of your business?" may have three possible answers including "Sales," "Service," and "Logistics." Such a first scoping question typically is aimed at identifying an area of business in which the application is going to be used. Answering "Sales" typically tells the configuration scoping application 202 that the area is "Sales" and a rule tied to the adaptation catalog entry for "Sales" specifies dependencies with packages, topics, and options and the corresponding solution capabilities of the application necessary or optional in using the application in a sales business. Such a rule can also specify that other packages, topics, and options and the corresponding solution capabilities be excluded.

Another example includes one or more scoping question that request information regarding the specific computer applications that are used to implement certain processes, procedures, functionality, or for specific purposes. Such as question may pose a scoping question that asks, "What computer application is used for accounting purposes?" Possible responses to such a question may include one or more computer applications of a certain software development organization and one or more computer applications of other software development organizations. The answers to such questions identify computer applications that are to be configured in the application configuration environment 102 and identify within the application configuration environment 102 computer application specific areas, packages, topics, and options for configuring the identified computer applications.

Figure 3:
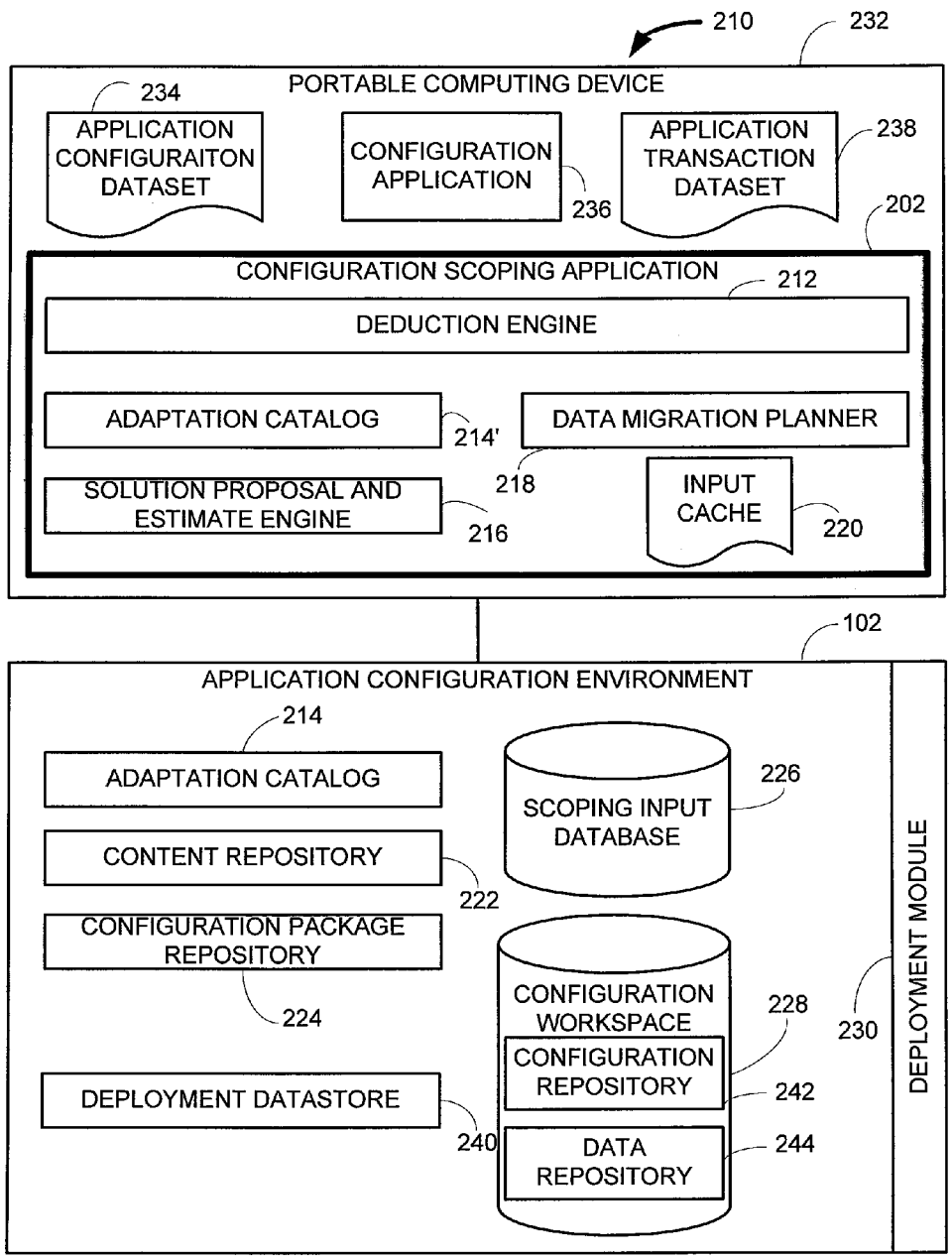
FIG. 3 is a block diagram of a system according to an example embodiment.

Thus, as a user answers scoping questions, the configuration of the applications is being performed. Further, when a question is answered that is associated with an adaptation catalog entry having a rule that excludes another area, package, topic, or option, that rule may be applied to eliminate questions from consideration. For example, when a user specifies an accounting software application that is used to implement accounting functionality, questions specific to other accounting computer applications may be eliminated from consideration. Conversely, when a question is answered that is associated with an adaptation catalog entry having a rule that requires another area, package, topic, or option, that same rule may be applied to determine a next question, or group of questions, to ask a user. However, in the event that a question is not answered that is linked to a rule providing defaults; the question may be skipped without adversely affecting the application configuration. FIG. 3 provides further detail of some embodiments of the configuration scoping application 202 in conjunction with an embodiment of the application configuration environment 102.

FIG. 3 is a block diagram of a system 210 according to an example embodiment. The system 210 includes a portable computing device 232 including a configuration application 236, an application configuration dataset 234 stored in a memory, an application transaction dataset 238, and the configuration scoping application 202. The system 210 further includes the application configuration environment 102. Although the application configuration environment 102 is not illustrated within the portable computing device 232, in some embodiments, the application configuration environment 102 may reside within the portable computing device 232. In other embodiments, the application configuration environment 102, the configuration scoping application 202, the application configuration dataset 234, the configuration application 236, and the application transaction dataset 238 may all reside on a computing device other than the portable computing device 232, such as on a desktop computer or on a server accessible via a remote user interface over a network. The remote user interface may include a web browser based user interface.

The configuration application 236, in some embodiments, typically provides a set of tools via user interfaces to a user. The tools of the configuration application 236 may allow the user to modify answers to scoping question answers stored in an input cache 220 of the configuration scoping application 202, the application configuration dataset 234, and the application transaction dataset 238. The application configuration dataset 234 may be populated with data copied from a configuration repository 242 stored within a configuration workspace 228 of the application configuration environment 102. The application transaction dataset 238, when present, may be populated with data copied either from a demonstration dataset stored in data repository 244 of the configuration workspace 228 or from the content repository 222.

Although the input cache 220 is illustrated within the configuration scoping application 202, the input cache 220 may exist separate from the configuration scoping application 202 within a memory of the portable computing device 232. In such embodiments, the input cache 220 may be populated with data copied from the scoping input database 226.

For the sake of understandability regarding several portions of the configuration scoping application 202 and the application configuration environment 102, these portions of the system 210 will be discussed followed by a more detailed discussion of the configuration application 236.

The configuration scoping application 202, in some embodiments, includes a deduction engine 212 and an adaptation catalog 214'. In this embodiment, the configuration scoping application 202 may further include a solution proposal and estimate engine 216, a data migration planner 218, and the input cache 220.

The application configuration environment 102, in some embodiments, includes an adaptation catalog 214, a content repository 222, and a configuration package repository 224. In some such embodiments, the application configuration environment 102 further includes a scoping input database 226, a configuration workspace 118, a deployment module 230, and a deployment data store 240.

The adaptation catalog 214 may include a representation of all of the solution capabilities of some or all applications that may be configured in the application configuration environment 102. Each capability of the application available for configuration is identified in an adaptation catalog 214 entry. The adaptation catalog 214 entries each may be associated with a particular application and be identified as an area, package, topic, or option and may be organized in a hierarchy with a child identifying the parent. An example hierarchy associated with one particular computer application is a "General Ledger" capability, which in some embodiments typically is a package having two topics, "cash based" and "accrual based" which are two capabilities of the particular computer application within the "General Ledger" capability.

The adaptation catalog 214 entries may further include scoping questions directed toward obtaining scoping information to identify applications to be configured and to determine what areas, packages, topics, and options are relevant to the user's needs. Additionally, the adaptation catalog entries typically include rules, the application of which can require inclusion or exclusion, or specify default inclusion or exclusion, of certain other areas, packages, topics, and options. Thus, because the areas, packages, topics, and options correlate to application capabilities, the inclusion, exclusion, and defaulting specifies what capabilities will be enabled and disabled in the application being configured when deployed by the deployment module 230.

In some embodiments, rules and entries in the adaptation catalog can be linked to a configuration package that exists in the configuration package repository 224. A configuration package includes one or more configuration settings that enable or disable functionality of computer applications when deployed by the deployment module 230 or by a configuration process within the application configuration environment 102 when configuring the applications within the configuration workspace 228. A configuration package can further be linked to one or more content items or content item definitions stored in the content repository 222. Some such content types include report layouts, forms, user interfaces, communication specifications, documentation, and other content that can be used in an application when deployed. Some content items may exist in multiple instances, where each instance is specific to a computer application that may be configured in the application configuration environment 102. A communication specification can include an XML schema, an EDI schema and connectivity information, mappings between file layouts and application data storage mechanisms, such as databases, and other similar communication specifications.

The rules of adaptation catalog 214 entries may also be used by the deduction engine 212 of the configuration scoping application 202. The configuration scoping application 202 typically presents a user interface to a user that requests answers to questions. The questions to be asked via the user interface may be identified by the deduction engine 212 based on the adaptation catalog 214'. The adaptation catalog 214' is typically a copy of the adaptation catalog 214 from the application configuration environment 102. When an answer is received by the configuration scoping application 202 through the user interface, the answer may be stored in the input cache 220 of the configuration scoping application 202. The deduction engine 212 may then apply the rule associated with the adaptation catalog 214' entry of the question asked to the received answer. Through the application of the rule, in view of answers already received and rules already applied, the deduction engine 212 typically identifies a next question to ask. The identified question may then be presented to the user through the user interface. This process typically continues until either all of the questions have been asked, the user is out of time, or otherwise chooses to stop. If questions remain that have not been answered, the process may be continued at a later time or rules specifying default areas, packages, topics, and options typically supply enough information to allow deployment of an identified application in a functional form.

In some embodiments, the configuration scoping application 218 may further include a data migration planner 218. In such embodiments, one or more additional scoping questions may be asked. These additional scoping questions are typically directed toward obtaining information from the user about legacy systems and how data is stored within them. In some embodiments, the questions simply may ask what systems are currently in use. In other embodiments, the questions may be more detailed to obtain information such as what type of database an application is utilizing and what type of customization has been made or custom applications developed. The data migration planner 218 may then use the answers to these additional questions to propose a data migration plan to the new application.

In some embodiments, the configuration scoping application 202 includes a solution proposal and estimate engine 216. The solution proposal and estimate engine 216 may be used in a sales situation. For example, if a sales person is discussing with a sales lead what a certain application product can do for the sales lead, the sales person typically can utilize the configuration scoping application 202 to obtain information about the needs of the sales lead via the scoping questions. The scoping question answers may then be utilized by the solution proposal and estimate engine 216 to make an initial determination of what will be involved if the sales lead decides to purchase the application. The solution proposal and estimate engine 216 normally is configured to output information for the sales lead to make several determinations, such as the size of effort necessary to implement or transition to the application from legacy system, the cost involved, and cost. In some embodiments, the output of the solution proposal and estimate engine 216 outputs one or more of an implementation cost estimate, an application solution proposal, and a recommended project roadmap. In some embodiments, the solution proposal and estimate engine 216 outputs a proposal for one or more other options, application descriptions, sales literature, benefit statements of using the application, and addition documents, such as a proposal of key performance indicators the application can monitor to assist in managing the application or enterprise of the sales lead.

The configuration scoping application 236 may also be used in other situations, such as when an application configuration needs to be updated. Answers to previously answered scoping questions in such instances may be modified via the configuration scoping application. However, the change in configuration may be considered more as an organizational configuration change rather than an application configuration change. Through the abilities to configure multiple computer applications via the unified application configuration environment 102, scoping questions may be answered and answers modified that will populate configuration changes across multiple applications. As a result, organizations may quickly reconfigure how they operate.

After the scoping question have been answered, the answers, and any other information obtained from a sales lead or other user of the configuration scoping application 202, the information typically is uploaded to the application configuration environment 102. However, in embodiments, where the configuration scoping application 202 executes on the same computing device as the application configuration environment 202, the scoping question answers and other information may be stored directly to the application configuration environment 102.

When the configuration question answers and other information is uploaded, or otherwise stored to the application environment 102, the scoping question answers are stored to the scoping input database 226. The scoping question answers, in some instances, will be referred to interchangeably as the "scoping information." The scoping information includes answers to scoping questions that are associated with one or more computer applications and configuration settings therefore through areas, packages, topics, and options.

After the scoping information is within the scoping input database 226, a process within the application configuration environment 102 typically executes to begin configuring each identified application in the configuration repository 242 of the configuration workspace 228. The configuration repository 242 may include a set of configuration tables that mirrors, at least in part, the configuration tables of each application that may be configured within the application configuration environment 102. The configuration repository 242 may include a set of configuration tables for each of multiple instances of the applications to allow use of the application configuration environment 102 to configure multiple instances of each application that may be configured with the application configuration environment 102.

The process that configures the applications may be configured to determine one or more configuration packages to instantiate in the configuration repository 242. Configuration packages, in some embodiments, may include one or a set of configuration settings to enable or disable certain capabilities of the application to which the package is relevant. Configuration packages, as mentioned above, may be linked to adaptation catalog 214 entries and rules associated with adaptation catalog entries. Thus, the process that configures the application in the configuration repository 242 may be configured to query the scoping information in the scoping input database 226 to identify configuration packages to instantiate.

In some embodiments, demonstration data may exist to facilitate instantiation of a demonstration instance of one or more applications for a sales lead, training session, or other purpose. The demonstration data, in some embodiments, may be linked to one or more applications and/or configuration packages from the configuration package repository 224. The demonstration data typically exists in the content repository 222 so that it can be copied into a set of application tables in the data repository 244 of the configuration workspace 228. These tables may hold such data as transactional data, operational data, master data, or other data that can exist in the application when the application is ready for execution or is executed.

Once the demonstration data is copied to the data repository 244, that data may be fine-tuned to more closely match the intended use of the demonstration data. For example, the system may be configured so that a sales person, or other individual, can fine-tune demonstration data values to more closely match a sales lead's expectations of the application. Such fine-tuning may include modifying sales order documents in the demonstration data to include a name, address, and logo of the sales lead's enterprise, or other similar modifications to the demonstration data.

Some embodiments of the application configuration environment 102 may further include the deployment data store 240. The deployment data store 240 typically stores a representation of computer application configurations of deployed computer applications. The representations of application configurations may be stored or updated in the deployment data store 240 by the deployment module 230 upon successful deployment of an application configuration.

A representation of an application configuration typically includes data representative of the application configuration settings. In some embodiments, the representation may further include data representative of content deployed to the application. An application configuration representation may exist for each deployed computer application that may be configured through the application configuration environment 102.

The deployment data store 240, in some embodiments, may be updated upon each configuration or content modification of a deployed system. In some embodiments, the deployment data store may further include a versioning mechanism that maintains not only a current configuration representation, but also historical representations, of one or more computer applications configured through the application configuration environment.

In some embodiments, the deployment data store 240, or a current copy thereof, may be maintained by an entity that developed, or otherwise offers for sale, an application configured via the application configuration environment. The deployment data store 240 may be used by such an entity to monitor current application usage, perform billing processes as a function of a current application configuration, provide application upgrade information based on portions of the application or content utilized, and for other purposes. In some embodiments, the entity may provide application updates, bug fixes, or other upgrades directly to a deployed application instance. Such updates, bug fixes, or other upgrades may be identified as relevant to a particular application instance as a function of the configuration representation in view of adaptation catalog 214 entries.

As described above, the configuration application 236, in some embodiments, may provide a set of tools via user interfaces to a user. The tools of the configuration application 236 typically allow the user to modify answers to scoping question answers stored in an input cache 220, the application configuration datasets 234, and the application transaction datasets 238. The application configuration datasets 234 may be populated with data copied from the configuration repository 242. The application transaction dataset 238 may be populated with data copied either from a demonstration dataset stored in the data repository 244 or from the content repository 222. The input cache 220, if separate from the configuration scoping application 202 may be populated with scoping information copied from the scoping input database 226.

Through use of the configuration application 236 user interfaces, a user may modify data within the application transaction dataset 238 to customize the data used of a demonstration application to more closely reflect how a sales lead's enterprise will use the application. For example, through modifying the transaction data, data displayed within the demonstration may include orders with products, customers, addresses, countries, and other details that truly reflect those of the sales lead's enterprise.

Further, use of the configuration application 236 user interfaces may also allow a user to further refine an application configuration to more closely match the needs of an organization, a customer, or a sales lead. This can include a user taking a copy of an application configuration to work on while away from a connection to the application to be configured or application configuration environment 102, such as when traveling.

Figure 4:
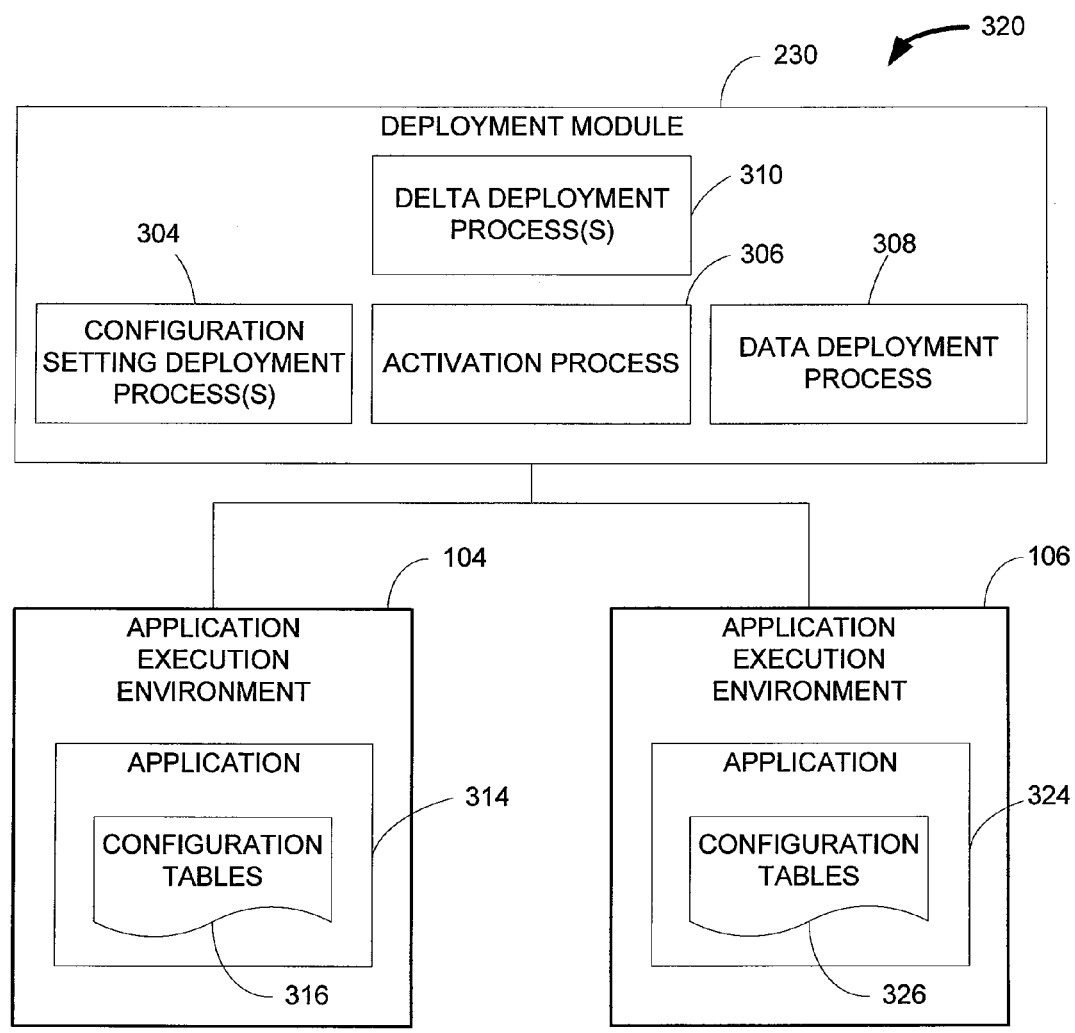
FIG. 4 is a block diagram of a system according to an example embodiment.

After the computer applications have been configured in the configuration workspace 228 and the demonstration data, if any, is ready, the configurations can be deployed by the deployment module 230. Detail of the deployment module 230 is provided in FIG. 4. FIG. 4 is a block diagram of a system 320 according to an example embodiment. The system 320 typically includes the deployment module 230 and the application execution environments 104, 106.

The deployment module 230 may include one or more configuration setting deployment processes 304, optional activation process(es) 306, and data deployment process(es) 308. Some embodiments of the deployment module may further include one or more delta deployment processes 310.

The application execution environments 104, 106 include respective distinct computer applications 314, 324. The computer applications 314, 324 may be baseline applications that have been instantiated, but are not yet configured. In other instances, the computer applications 314, 324 may be applications that are already configured, but the configurations may be in need of an update by a process of the deployment module 230. In either instance, the computer applications 314, 324 may each include a set of configuration tables 316, 326, or other data stores depending on the specific application 314, 324, that will be populated, or updated, by the deployment module 230. The applications 314, 324 may further include other tables, data structures, and storage locations that may be populated and/or updated by the deployment module 230 with one or more of demonstration data, application data, content, or other data.

The deployment module 230, when executed, typically operates to deploy configurations of applications configured in the application configuration environment. Deployment is typically performed by one or more of the processes of the deployment module 230. These processes may include one or more configuration setting deployment processes 304, data deployment processes 308, activation processes 306, and delta deployment processes 310. Some embodiments of the deployment module 230 may include one or more of these processes.

The configuration setting deployment processes 304 typically deploy configuration settings to the configuration tables 316, 326 of the applications 314, 324 if the computer application 314, 324 have already been instantiated. However, in some embodiments, if the computer applications 314, 324 have not been instantiated, the configuration setting deployment processes 304, or other process of the deployment module 230, may instantiate the computer application(s) 314, 324 or call another process that will instantiate the computer application(s) 314, 324. The deployment of the configuration settings may include a copying of configuration settings from the configuration tables of the configuration repository 242 to the configuration tables 316, 326 of the respective application 314, 324. In some embodiments, a configuration setting that is copied to one of the computer applications 314, 324 may refer to an item of content or data stored in the data repository 244, of FIG. 3, or the content repository 222, of FIG. 3. In some such instances, the configuration setting deployment process 304 for the respective application 314, 324 may call a method of the data deployment process 308 to cause that data or content to be copied to the application 314, 324. In other embodiments, that data or content may be copied when the data deployment process 308 is executed at either an earlier or a later time.

The data deployment processes 308 may be executed if there is demonstration data in the configuration workspace 228 or if there is content to deploy from the data repository 244 of FIG. 3 or the content repository 222 of FIG. 3. If there is demonstration data, the data may be copied from the configuration workspace 228 to application tables, data structures, storage locations, or other data stores in the application execution environment 104. If a proper table, data structure, storage location, or other data store does not exist in the application execution environment 104, 106, the data deployment process, in some embodiments, is configured to execute, or call a method of another module, to cause that data location to be created or allocated.

Some embodiments of the deployment module 230 may further include the activation processes 306. The activation processes, in some embodiments, are configured to execute to activate the computer applications 314, 316 after they have been successfully deployed. In some instances, the activation process 306 may require an activation key, message, code, or other authorization from an activation authority to activate a configured application 314, 316. The activation authority may include one or more of a number of individuals or entities. An example of an activation authority may include an entity selling or an organization that developed the computer application 314, 324 to be activated.

Such activation processes 306 and associated functionality may be utilized for several purposes. Some such purposes may include allowing the entity selling the application to ensure the application is properly configured, has passed certain testing necessary for the entity to ensure it will meet guaranteed service level agreements or objectives, for billing purposes, or other purposes that may benefit from such an activation process.

In some embodiments, an activation key, or other activation signal may be received over a network, such as the Internet. In other embodiments, an activation key, or other activation signal, may be manually input into an administration user interface or configuration table of a configured application 314, 324.

In some embodiments, the deployment module 230 may further include the delta deployment processes 310. The delta deployment processes 310 are typically only relevant after an application has already been deployed. When an application is deployed, or subsequently modified, a representation of the application configuration may be stored or updated in the deployment data store 240 as described and illustrated with reference to FIG. 3. This may enable tracking of a current configuration of a deployed application. In embodiments including the delta deployment processes 310, the scoping information may further be tracked on a historical basis to provide a view of a current configuration and a modified configuration not yet deployed, if applicable. The delta deployment processes 310 may then use that historical tracking of the application configuration to identify changes between the current application configurations and modified configurations not yet deployed. The delta deployment processes 310 may then only deploy the changes to the application configurations and any additional content needed or otherwise referenced by the new application configuration.

The processes 304, 306, 308, 310 of the deployment module 230 may be in the form of a single process or multiple process modules depending on the particular embodiment. For example, in some embodiments, a process module may exist for each of the processes 304, 306, 308, 310 for each distinct application that may be configured in the application configuration environment 102 of FIG. 3. In other embodiments, a single process module may exist for each process 304, 306, 308, 310, but each single process module is able to communicate with each distinct application 314, 324 type that may be configured in the application configuration environment 102 of FIG. 3.

Figure 5:
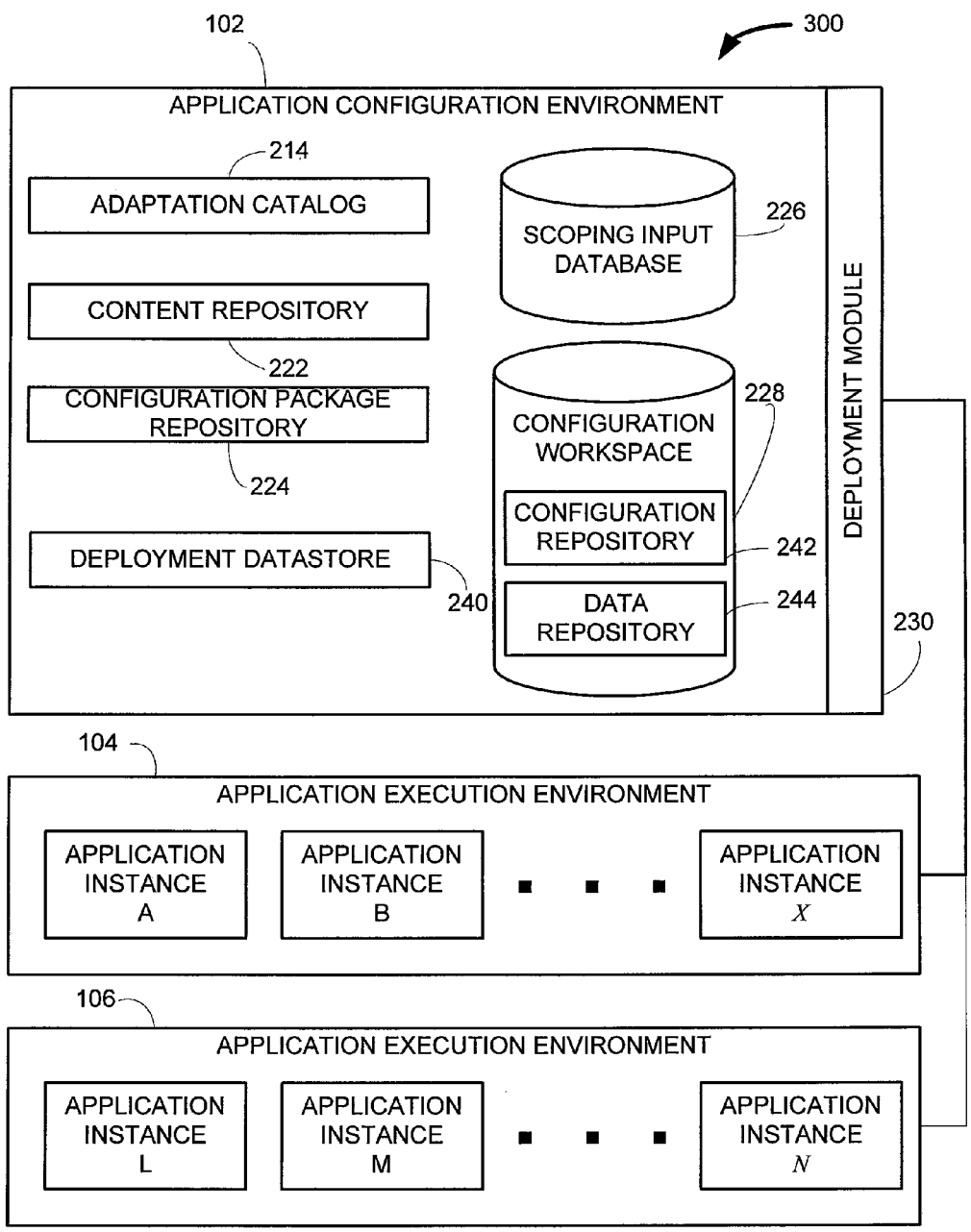
FIG. 5 is a block diagram of a system according to an example embodiment.

FIG. 5 is a block diagram of a system 300 according to an example embodiment. The system 300 includes the application configuration environment 102 as discussed above with regard to FIG. 1, FIG. 2, and FIG. 3. The system 300 further includes application execution environments 104, 106.

The application execution environments 104, 106 are data processing environments within which an application, or an application to be deployed, may execute. When deploying an application, the deployment module 230 typically needs to know what application execution environment 104, the type of the application, and what application instance within that environment. In embodiments including only one application execution environment 104, 106, the application execution environment 104 may already be known. Similarly, in an application execution environment including only a single application instance, the instance may already be known.

Each instance of an application (i.e., application instances A, B, . . . X; or application instances L, M, . . . N) typically includes a set of identical configuration tables which may include distinct configuration settings from one another. In some embodiments, multiple instances of the application may exist such as to provide a development instance, a test instance, and a production instance. In such embodiments where there are multiple application instances, the deployment module 230 may deploy the configuration settings from one of the application instances in an application execution environment 104, 106 to another application in the same or another application execution environment 104, 106. Although the deployment module 230 is illustrated as being a part of the application configuration environment 102, the deployment module 230, in other embodiments, may be a standalone application or a part of another application or process.

Figure 6:
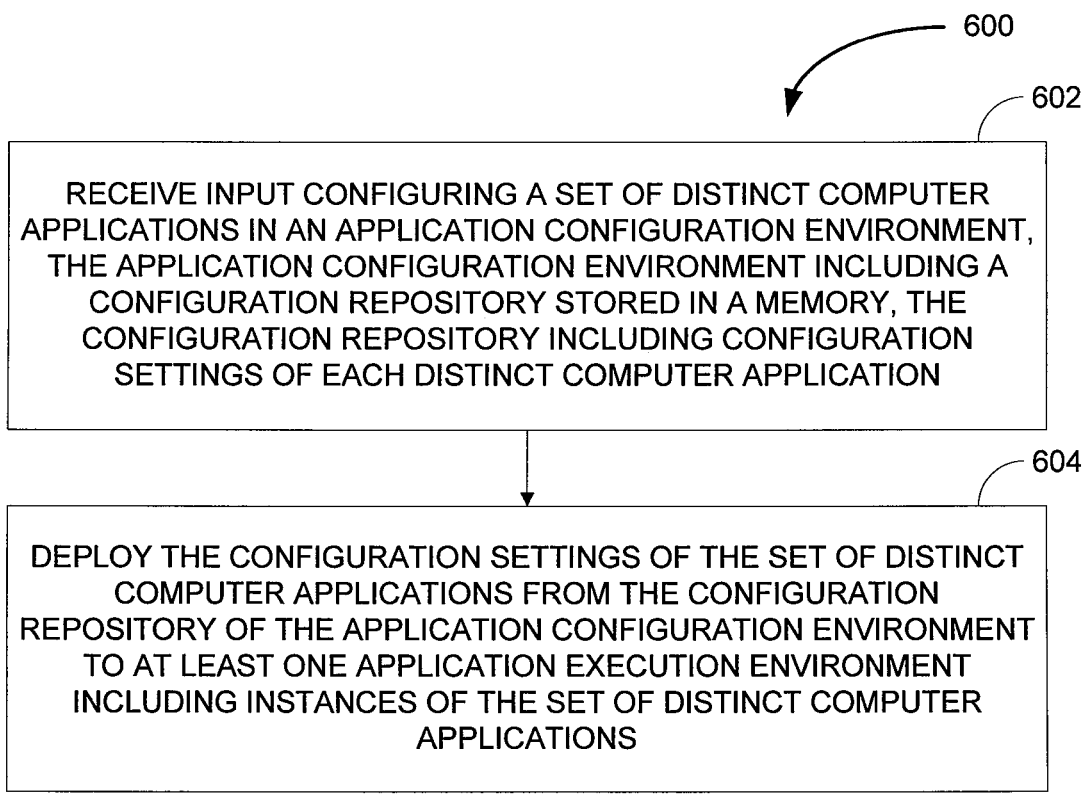
FIG. 6 is a block flow diagram of a method according to an example embodiment.

FIG. 6 is a block flow diagram of a method 600 according to an example embodiment. Method 600 is an example of a method that may be performed to configure a set of distinct computer applications in a unified manner. The method 600 includes receiving 602 input configuring a set of distinct computer applications in an application configuration environment. The application configuration environment in such embodiments may include a configuration repository stored in a memory including configuration settings of each distinct computer application. The method 600 further includes deploying 604 the configuration settings of the set of distinct computer applications from the configuration repository to at least one application execution environment including and instance of one of the set of distinct computer applications. The application configuration environment may include a dataset with regard to each distinct computer application where each dataset is representative of at least some configuration settings of the respective distinct computer application.

The application configuration environment may further include a data repository stored in the memory storing data to be included with at least one of the distinct computer applications when deployed. In such embodiments, the deploying may also include deploying data from the data repository to a data store of at least one of the distinct computer applications in the at least one application execution environment.

Receiving 602 input configuring the set of distinct computer applications may include receiving input in response to scoping questions related to configuring the set of distinct computer applications and applying an adaptation catalog to the received input to translate the received input to configuration settings for the set of distinct computer applications. The configuration settings may then be stored in the configuration repository. The adaptation catalog in such embodiments may include an entry for each scoping question and a mapping from each possible answer to at least one configuration setting of one or more of the set of distinct computer applications.

Figure 7:
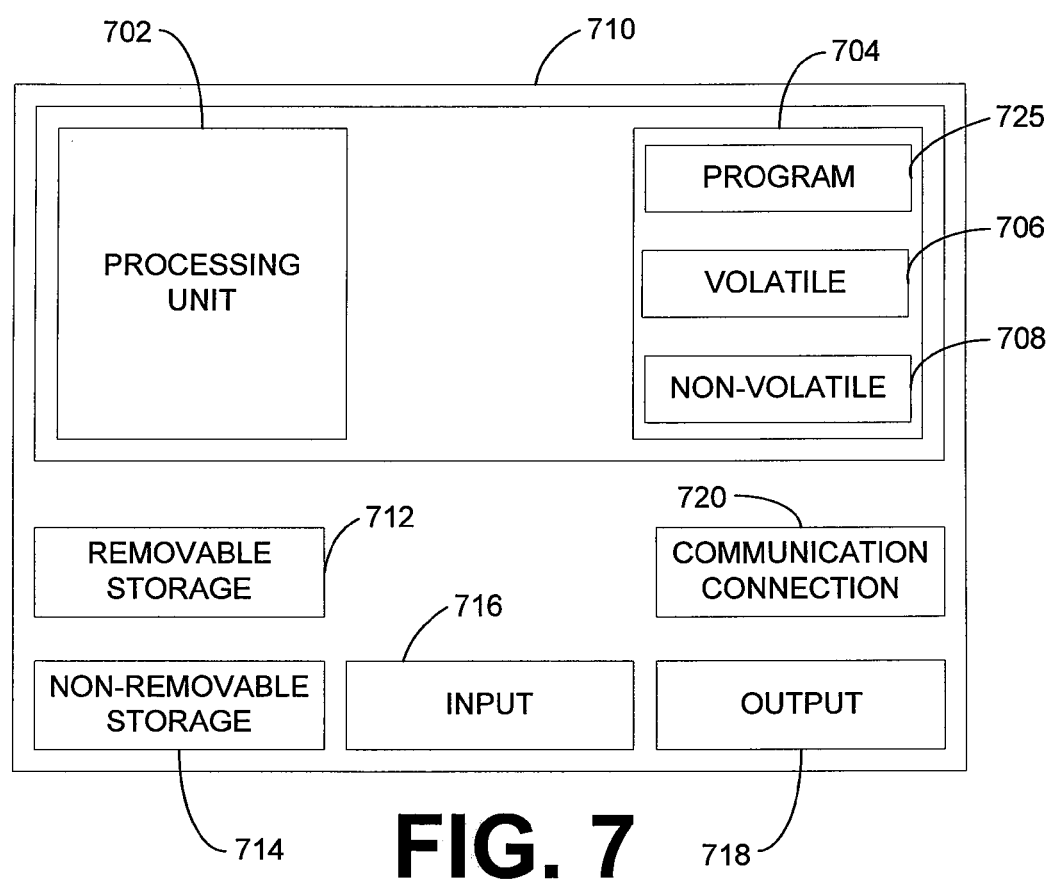
FIG. 7 is a block diagram of a system according to an example embodiment.

FIG. 7 is a block diagram of a computing device according to an example embodiment. In one embodiment, multiple such computing devices are utilized in a distributed network to implement multiple components of the various embodiments described above, such as the application configuration environment, the application execution environments, and the portable computing device. An object oriented, service oriented, or other architecture may be used to implement such functions and communicate between the multiple systems and components. One example computing device in the form of a computer 710 may include one, two, or more processing units 702, one or more memory 704 and removable storage devices 712 and non-removable storage devices 714. Memory 704 may include volatile memory 706 and non-volatile memory 708. Computer 710 may include—or have access to a computing environment that includes—a variety of computer-readable media, such as volatile memory 706 and non-volatile memory 708, removable storage 712, and non-removable storage 714. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 710 may include or have access to a computing environment that includes input 716, output 718, and a communication connection 720. The computer may operate in a networked environment using a communication connection to connect to one or more remote computers, such as database servers. The remote computer may include a personal computer (PC), server, router, network PC, a peer device or other common network node, or the like. The communication connection may include a Local Area Network (LAN), a Wide Area Network (WAN), System Area Network (SAN), or other networks.

Computer-readable instructions stored on a computer-readable medium are executable by the processing unit 702 of the computer 710. A hard drive, CD-ROM, and RAM are some examples of articles including a computer-readable medium. The computer-readable instructions, when executed by a processing unit 702 may perform one or more of the methods and processes described above.

The various operations of example methods and processes described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods and processes described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs)).

It is emphasized that the Abstract is provided to comply with 37 C.F.R. §1.72(b) requiring an Abstract that will allow the reader to quickly ascertain the nature and gist of the technical disclosure. It is submitted with the understanding that it will not be used to interpret or limit the scope or meaning of the claims.

In the foregoing Detailed Description, various features are grouped together in a single embodiment to streamline the disclosure. This method of disclosure is not to be interpreted as reflecting an intention that the claimed embodiments of the inventive subject matter require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

What is claimed is:

1. A method comprising:
 receiving, in response to scoping questions, a single set of user input configuring a set of distinct computer applications in a single application configuration environment, the application configuration environment including a configuration repository stored in a memory, the configuration repository storing configuration settings of each distinct computer application separately from configuration settings that the distinct computer applications utilize during execution, the configuration settings of each distinct computer application obtained through application of an adaptation catalog to the single set of received user input to translate the received user input to configuration settings for each of the set of distinct computer applications, the adaptation catalog including a representation of application solution capabilities linked to possible scoping question answers by rules mapping each possible scoping question answer to at least one configuration package including configuration settings for at least one of the set of distinct computer applications, wherein the application solution capabilities are hierarchically divided into areas, packages, topics, and options, of which the adaptation catalog contains inclusive and exclusive rules that model dependencies between the areas, packages, topics, and options; and
 deploying the configuration settings of the set of distinct computer applications from the configuration repository of the application configuration environment, via a network, to at least one application execution environment including an instance of at least one of the set of distinct computer applications.

2. The method of claim 1, wherein:
 the application configuration environment further includes a data repository stored in the memory, the data repository including data to be included with at least one of the distinct computer applications when deployed; and
 the deploying further includes deploying data from the data repository to a data store of at least one of the distinct computer applications in the at least one application execution environment.

3. The method of claim 1, wherein the application configuration environment includes a dataset with regard to each distinct computer application, each dataset representative of at least some configuration settings of the respective distinct computer application.

4. The method of claim 1, wherein the set of distinct computer applications includes two computer applications, each of the two computer applications developed by distinct software development organizations.

5. The method of claim 1, wherein the at least one application execution environment includes at least one computing device configured to execute at least one of the set of distinct computer applications.

6. The method of claim 5, wherein:
the at least one application execution environment includes two application execution environments communicatively coupled via the network to one another and the application execution environment; and
each of the two application execution environments includes at least one of the set of distinct computer applications.

7. A computer-readable storage medium, with instructions stored thereon, which when executed by a processor of a computer, cause the computer to:
receive, in response to scoping questions, a single set of user input configuring a set of distinct computer applications in a single application configuration environment, the application configuration environment including a configuration repository stored in a memory, the configuration repository storing configuration settings of each distinct computer application separately from configuration settings that the distinct computer applications utilize during execution, the configuration settings of each distinct computer application obtained through application of an adaptation catalog to the single set of received user input to translate the received user input to configuration settings for each of the set of distinct computer applications, the adaptation catalog including a representation of application solution capabilities linked to possible scoping question answers by rules mapping each possible scoping question answer to at least one configuration package including configuration settings for at least one of the set of distinct computer applications, wherein the application solution capabilities are hierarchically divided into areas, packages, topics, and options, of which the adaptation catalog contains inclusive and exclusive rules that model dependencies between the areas, packages, topics, and options; and
deploy the configuration settings of the set of distinct computer applications from the configuration repository of the application configuration environment, via a network, to at least one application execution environment including instances of the set of distinct computer applications.

8. The computer-readable storage medium of claim 7, wherein:
the application configuration environment further includes a data repository stored in the memory, the data repository including data to be included with at least one of the distinct computer applications when deployed; and
the deploying further includes deploying data from the data repository to a data store of at least one of the distinct computer applications in the at least one application execution environment.

9. The computer-readable storage medium of claim 7, wherein the application configuration environment includes a dataset with regard to each distinct computer application, each dataset representative of at least some configuration settings of the respective distinct computer application.

10. The computer-readable storage medium of claim 7, wherein the set of distinct computer applications includes two computer applications, each of the two computer applications developed by distinct software development organizations.

11. The computer-readable storage medium of claim 7, wherein the at least one application execution environment includes at least one computing device configured to execute at least one of the set of distinct computer applications.

12. The computer-readable storage medium of claim 11, wherein:
the at least one application execution environment includes two application execution environments communicatively coupled via the network to one another and the application execution environment; and
each of the two application execution environments includes at least one of the set of distinct computer applications.

13. A system comprising:
at least one processor coupled to a bus;
at least one memory device coupled to the bus;
a network interface coupled to the bus;
a single configuration environment database stored in at least one of the at least one memory devices, the configuration environment database to store a single set of received configuration user input for a set of distinct computer applications, the configuration user input received in response to scoping questions, the single configuration environment database storing the single set of received configuration user input separately from configuration settings that the distinct computer applications utilize during execution, the configuration settings of each distinct computer application obtained through application of an adaptation catalog to the single set of received configuration user input to translate the received configuration user input to configuration settings for each of the set of distinct computer applications, the adaptation catalog including a representation of application solution capabilities linked to possible scoping question answers by rules mapping each possible scoping question answer to at least one configuration package including configuration settings for at least one of the set of distinct computer applications, wherein the application solution capabilities are hierarchically divided into areas, packages, topics, and options, of which the adaptation catalog contains inclusive and exclusive rules that model dependencies between the areas, packages, topics, and options; and
an instruction set stored in the at least one memory device and executable by the processor to:
identify which distinct computer application configurations are affected by the received configuration user input;
translate received configuration user input to configuration settings of the identified distinct computer applications; and
deploy the translated configuration settings, via a network, to the identified distinct computer applications over the network interface.

14. The system of claim 13, wherein translated configuration settings are stored in the configuration environment database.

15. The system of claim 13, wherein the set of distinct computer applications includes two computer applications, each of the two computer applications developed by distinct software development organizations.

* * * * *